US011880050B2

(12) United States Patent
Ge et al.

(10) Patent No.: US 11,880,050 B2
(45) Date of Patent: Jan. 23, 2024

(54) VIRTUAL REALITY LENS BARREL ASSEMBLY, VIRTUAL REALITY DEVICE AND CONTROL METHOD

(71) Applicants: Beijing BOE Optoelectronics Technology Co., Ltd., Beijing (CN); BOE Technology Group Co., Ltd., Beijing (CN)

(72) Inventors: Zheng Ge, Beijing (CN); Wenhong Tian, Beijing (CN); Zhanshan Ma, Beijing (CN); Haoran Jing, Beijing (CN); Zhiyu Sun, Beijing (CN); Chao Zheng, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 790 days.

(21) Appl. No.: 16/709,045

(22) Filed: Dec. 10, 2019

(65) Prior Publication Data

US 2020/0271831 A1 Aug. 27, 2020

(30) Foreign Application Priority Data

Feb. 25, 2019 (CN) .......................... 201910143707.0

(51) Int. Cl.
*G02B 5/00* (2006.01)
*G02B 7/02* (2021.01)
(52) U.S. Cl.
CPC ............... *G02B 5/005* (2013.01); *G02B 7/02* (2013.01)

(58) Field of Classification Search
CPC .. G02B 5/005; G02B 7/02; G02B 2027/0132; G02B 27/0176; G02B 27/0172
(Continued)

(56) References Cited

U.S. PATENT DOCUMENTS 3,590,703 A * 7/1971 Ono ..................... G03B 17/245
396/152
4,178,090 A * 12/1979 Marks .................... G03B 35/10
396/354
(Continued)

FOREIGN PATENT DOCUMENTS

CN 101533144 A 9/2009
CN 102207599 A 10/2011
(Continued)

OTHER PUBLICATIONS

Examiner provided machine translation of Xu, Xian et al., CN204389787 (Year: 2015).*
(Continued)

*Primary Examiner* — Balram T Parbadia
*Assistant Examiner* — Rahman Abdur
(74) *Attorney, Agent, or Firm* — Lippes Mathias LLP

(57) ABSTRACT

A virtual reality lens barrel assembly, a virtual reality device and a control method, belonging to the field of virtual reality technology is provided. The virtual reality lens barrel assembly includes a lens, a blocking mechanism and a lens barrel, the lens and the blocking mechanism are both located outside a first opening of the lens barrel, and a second opening of the lens barrel is configured to place a display assembly; and the blocking mechanism includes a through
(Continued)

hole with a variable size, and an optical axis of the lens passes through a center of the through hole and the first opening.

15 Claims, 10 Drawing Sheets

(58) Field of Classification Search
USPC .......................................................... 359/234
See application file for complete search history.

(56) References Cited

U.S. PATENT DOCUMENTS

| | | | |
|---|---|---|---|
| 2009/0232484 A1 | 9/2009 | Kudoh | |
| 2011/0235001 A1* | 9/2011 | Matsumoto | G02B 7/10 |
| | | | 359/740 |
| 2013/0128106 A1* | 5/2013 | Tam | H04N 5/2253 |
| | | | 348/374 |
| 2014/0334776 A1* | 11/2014 | Kato | G02B 6/2937 |
| | | | 385/27 |
| 2018/0063508 A1 | 3/2018 | Trail et al. | |
| 2019/0028697 A1* | 1/2019 | Sullivan | H04N 13/344 |
| 2019/0179211 A1 | 6/2019 | Endo | |
| 2019/0302394 A1 | 10/2019 | Zhou et al. | |

FOREIGN PATENT DOCUMENTS

| | | | |
|---|---|---|---|
| CN | 109313375 | * | 2/2015 |
| CN | 205157821 U | | 4/2016 |
| CN | 106405833 | * | 2/2017 |
| CN | 106405833 A | | 2/2017 |
| CN | 206556559 U | | 10/2017 |
| CN | 207924627 U | | 9/2018 |
| CN | 109313375 A | | 2/2019 |
| JP | 2007065040 A | | 3/2007 |

OTHER PUBLICATIONS

Examiner provided machine translation of Zhu, Jing-wei et al., CN205374880 (Year: 2016).*
Examiner provided machine translation of Zhang Xiubao et al., CN106405833 (Year: 2017).*
Examiner provided machine translation of Endo Junichi et al., CN109313375 (Year: 2019).*
First office action of Chinese application No. 201910143707.0 dated Sep. 2, 2020.
Second office action of Chinese application No. 201910143707.0 dated Nov. 18, 2020.

* cited by examiner

VIRTUAL REALITY LENS BARREL ASSEMBLY, VIRTUAL REALITY DEVICE AND CONTROL METHOD

The present disclosure claims priority to Chinese Patent Application No. 201910143707.0, filed on Feb. 25, 2019 and entitled "VIRTUAL REALITY LENS BARREL ASSEMBLY, VIRTUAL REALITY DEVICE AND CONTROL METHOD", the entire contents of which are incorporated herein by reference.

TECHNICAL FIELD

The present disclosure relates to the field of virtual reality technology, and more particularly to a virtual reality lens barrel assembly, a virtual reality device and a control method.

BACKGROUND

A virtual reality (VR for short) lens barrel assembly is an assembly applied in a virtual reality device. A user can observe a display assembly by the VR lens barrel assembly so as to improve the immersion which may be provided by the VR lens barrel assembly.

The VR lens barrel assembly in the related art includes a lens and a lens barrel. The lens is located outside one opening of the lens barrel, and the other opening of the lens barrel is provided with a display assembly. The size of a display area of each display assembly corresponds to a lens to ensure that a picture displayed in the display area can fill a view of the user as much as possible, so as to improve the immersion which may be provided by the VR lens barrel assembly.

SUMMARY

A virtual reality lens barrel assembly, a virtual reality device and a control method is provided according to the embodiments of the present disclosure. The technical solutions are as follows.

According to one aspect, a virtual reality lens barrel assembly is provided, and the virtual reality lens barrel assembly includes a lens, a blocking mechanism and a lens barrel;

the lens barrel is of a tubular structure with a first opening and a second opening, the lens and the blocking mechanism are both located outside the first opening, and the second opening of the lens barrel is provided with a display assembly; and the blocking mechanism includes a through hole with a variable size, and an optical axis of the lens passes through a center of the through hole and the first opening.

Optionally, the blocking mechanism is an iris diaphragm.

Optionally, the blocking mechanism includes a ring support and a plurality of hinges assembled on the ring support, and the through hole is surrounded and formed by the plurality of hinges.

Optionally, the blocking mechanism includes a sleeve, the sleeve is sleeved on the ring support and rotatably connected with the ring support, a plurality of guide rails are provided on the ring support, and the plurality of hinges are assembled on the plurality of guide rails in a one-to-one manner, and the plurality of hinges are respectively connected with the sleeve.

When rotating, the sleeve drives the plurality of hinges to move on the plurality of guide rails to adjust the size of the through hole.

Optionally, a circular slide rail is provided on an inner wall of the sleeve, an axis of the circular slide rail is parallel to an axis of the sleeve, and the ring support is assembled on the circular slide rail.

Optionally, a plurality of first gear teeth are provided on an outer wall of the sleeve, and the plurality of first gear teeth are arranged along a circumferential direction of the sleeve; the blocking mechanism includes an adjusting knob; a plurality of second gear teeth are provided on the adjusting knob, and the plurality of second gear teeth are arranged along a circumferential direction of the adjusting knob; and the second gear teeth are meshed with the first gear teeth.

Optionally, a plurality of level scales are provided on the adjusting knob, and each of the level scales corresponds to a display area of one size. Alternatively, the virtual reality lens barrel assembly includes a motor, wherein the motor is connected with the adjusting knob for driving the adjusting knob to rotate.

Optionally, the blocking mechanism is located at one side, which is close to the lens barrel, of the lens.

Optionally, when the through hole has a maximum size, the through hole is located in an area in which an orthographic projection of the lens on the blocking mechanism is located.

Optionally, the lens barrel is made of polyvinyl chloride or ethylene-tetra-fluoro-ethylene.

Optionally, a light absorbing material layer is provided on an inner wall of the lens barrel.

Optionally, the blocking mechanism is positioned on one side, which is close to the lens barrel, of the lens;
  the blocking mechanism includes a sleeve, a ring support and a plurality of hinges assembled on the ring support, the through hole is surrounded and formed by the plurality of hinges, the sleeve is sleeved on the ring support and rotatably connected with the ring support, a plurality of guide rails are provided on the ring support, the plurality of hinges are assembled on the plurality of guide rails in a one-to-one manner, the plurality of hinges are respectively connected with the sleeve, and when the sleeve rotates, the plurality of hinges are driven to move on the plurality of guide rails to adjust the size of the through hole;
  a circular slide rail is provided on an inner wall of the sleeve, an axis of the circular slide rail is parallel with an axis of the sleeve, and the ring support is assembled on the circular slide rail;
  a plurality of first gear teeth are provided on an outer wall of the sleeve, the plurality of first gear teeth are arranged along a circumferential direction of the sleeve, the blocking mechanism includes an adjusting knob; a plurality of second gear teeth are provided on the adjusting knob, and the plurality of second gear teeth are arranged along a circumferential direction of the adjusting knob; and the plurality of second gear teeth are meshed with the plurality of first gear teeth; and
  a plurality of level scales are provided on the adjusting knob, and the plurality of level scales respectively correspond to plurality of display assemblies with display areas of different sizes.

In another aspect, there is provide a virtual reality device, including at least one virtual reality lens barrel assembly, each of the at least one virtual reality lens barrel assembly includes a lens, a blocking mechanism and a lens barrel, wherein the lens barrel is of a tubular structure with a first opening and a second opening, the lens and the blocking mechanism are both located outside the first opening, and the second opening of the lens barrel is used to play a display assembly; and the blocking mechanism includes a through hole with a variable size, and an optical axis of the lens passes through a center of the through hole and the first opening.

Optionally, the virtual reality device includes two of the virtual reality lens barrel assemblies and display assemblies corresponding to the two of the virtual reality lens barrel assemblies.

Optionally, the blocking mechanism is located at one side, which is close to the lens barrel, of the lens;

the blocking mechanism includes a sleeve, a ring support and a plurality of hinges assembled on the ring support, the through hole is surrounded and formed by the plurality of hinges, the sleeve is sleeved on the ring support and rotatably connected with the ring support, a plurality of guide rails are provided on the ring support, the plurality of hinges are assembled on the plurality of guide rails in a one-to-one manner, the plurality of hinges are respectively connected with the sleeve, and when the sleeve rotates, the plurality of hinges are driven to move on the plurality of guide rails to adjust the size of the through hole;

a circular slide rail is provided on an inner wall of the sleeve, an axis of the circular slide rail is parallel with an axis of the sleeve, and the ring support is assembled on the circular slide rail;

a plurality of first gear teeth are provided on an outer wall of the sleeve, the plurality of first gear teeth are arranged along a circumferential direction of the sleeve; the blocking mechanism includes an adjusting knob; a plurality of second gear teeth are provided on the adjusting knob, and the plurality of second gear teeth are arranged along a circumferential direction of the adjusting knob; and the plurality of second gear teeth are meshed with the plurality of first gear teeth; and a plurality of level scales are provided on the adjusting knob, and the plurality of level scales respectively correspond to plurality of display assemblies with display areas of different sizes.

In yet another aspect, a control method for a virtual reality lens barrel assembly is provided, and the control method is applied to the virtual reality lens barrel assembly, the virtual reality lens barrel assembly includes a lens, a blocking mechanism and a lens barrel, the lens is of a tubular structure with a first opening and a second opening, the lens and the blocking mechanism are both located outside the first opening, and the second opening of the lens barrel is provided with a display assembly; and the blocking mechanism includes a through hole with a variable size, and an optical axis of the lens passes through a center of the through hole and the first opening, and the control method includes:

determining a size of a display area of the display assembly; and adjusting a size of the through hole of the blocking mechanism according to the size of the display area, such that the size of the display area matches a view range of a human eye of the display area.

DETAILED DESCRIPTION

Embodiments of the present disclosure will be described below with reference to accompanying drawings.

The virtual reality technology is one kind of computer simulation technology which may create and experience a virtual world. A virtual reality device is a device to which the virtual reality technology is applied, and the virtual reality device is used to provide a user with a virtual reality viewing experience.

In the virtual reality technology, a binocular stereo vision plays an important role. Different images seen by two eyes of a user are respectively generated and displayed on different display screens. When the user wears an optically designed virtual reality device (such as a pair of VR glasses), one eye can only see odd-numbered frames of images, and the other eye can only see even-numbered frames of images. The difference (that is, parallax) between the odd-numbered frames and the even-numbered frames gives the user a stereoscopic impression. Because the human eye does not directly view the screen, but indirectly views the screen through an optical element such as a lens. In order to obtain a better immersion and a visual effect, a light path will be designed for the screen, and the best experience has been achieved.

A virtual reality device generally includes two virtual reality lens barrel assemblies and display screens matching each virtual reality lens barrel assembly, and the display screens are used to respectively provide a display of an image to both eyes of a person. Each virtual reality lens barrel assembly includes a lens barrel and a lens located outside one opening of the lens barrel. The display screen matching the virtual reality lens barrel assembly is located at another opening of the lens barrel, and human eyes view the display screen at one opening of the lens barrel through the lens located outside the other opening of the lens barrel. The lens may change the range occupied by the picture displayed by the display screen in the human eyes, so as to improve the immersion of the virtual reality device.

However, for display screens with display areas of different sizes, there is a need for lenses with different parameters (the parameters may include a focal length, a size, and the like) to match the display screens, so that pictures displayed on the display screen may occupy the view of the user as much as possible. This makes each virtual reality lens barrel assembly can only match one display screen. If the display screens with display areas of different sizes are used, the view of the user does not match the display area of the display screen, which will greatly reduce the immersion of the user.

Figure 1:
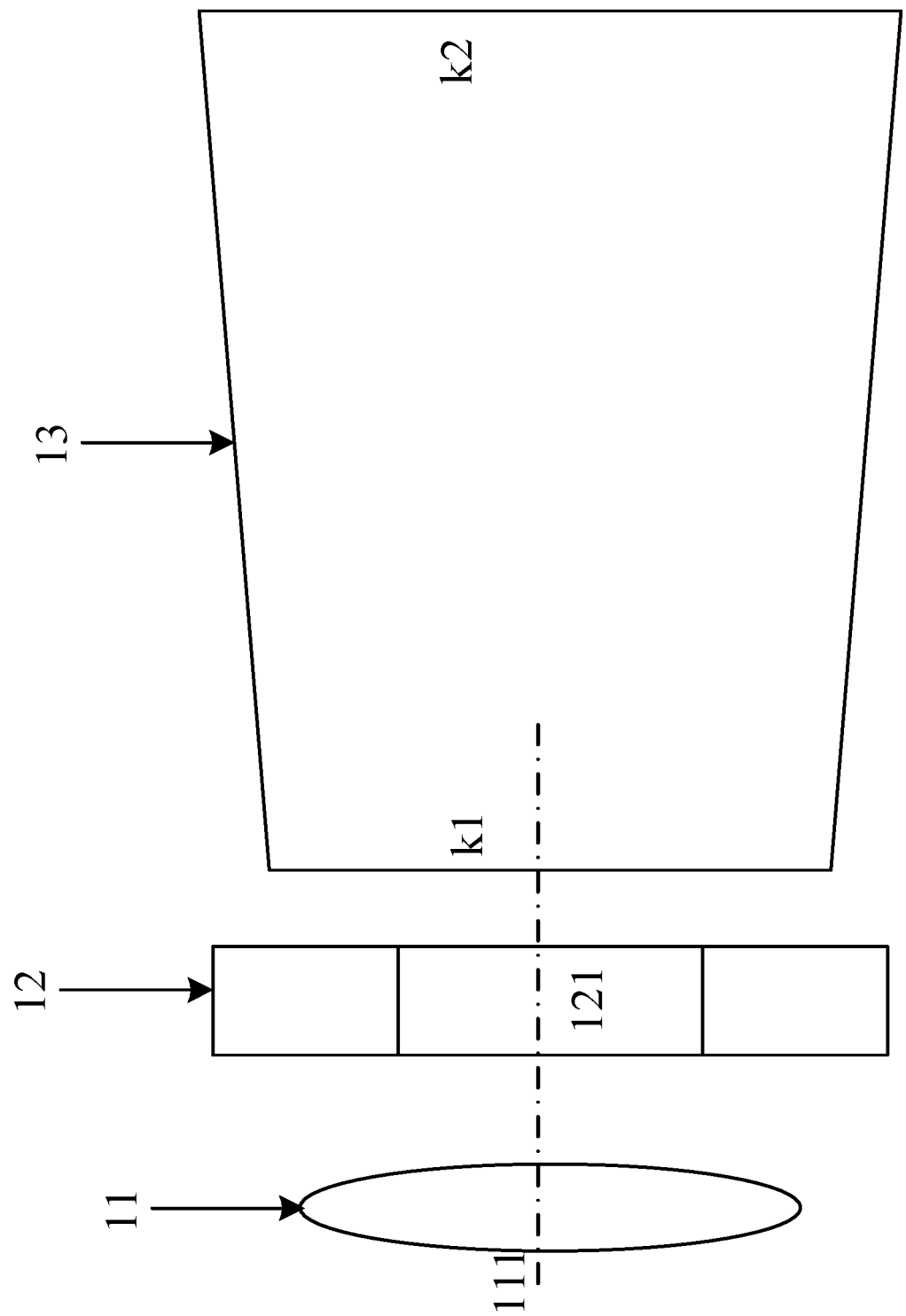
FIG. 1 is a schematic diagram showing a structure of a virtual reality lens barrel assembly according to an embodiment of the present disclosure.

FIG. 1 is a schematic diagram showing a structure of a virtual reality lens barrel assembly according to an embodiment of the present disclosure. The virtual reality lens barrel assembly may include:

a lens 11, a blocking mechanism 12 and a lens barrel 13.

The lens barrel 11 is of a tubular structure with a first opening k1 and a second opening k2. The lens 11 and the blocking mechanism 12 are both located outside the first opening k1. The second opening k2 of the lens barrel 13 is provided with a display assembly. The blocking mechanism 12 includes a through hole 121 with a variable size. The optical axis 111 of the lens 11 passes through a center of the through hole 121 and the first opening k1. The center of the through hole 121 may refer to a geometric center of the through hole 121. For example, when the through hole is a circular through hole, the center may refer to a center of a circle, and when the through hole is a rectangular through hole, the center may refer to an intersection of diagonal lines.

In summary, in the virtual reality lens barrel assembly provided by the embodiment of the present disclosure, the blocking mechanism including the through hole with the variable size is provided in the lens barrel assembly, and the view range of the human eye is adjusted by the through hole with the variable size, so that the view range matches the size of the display area of the display assembly. In this way, the immersion of the virtual reality lens barrel assembly is improved. The problem that the immersion which may be provided by the VR lens barrel assembly in the related art is poor is solved. The effect of improving the immersion which may be provided by the VR lens barrel assembly is achieved.

Figure 2:
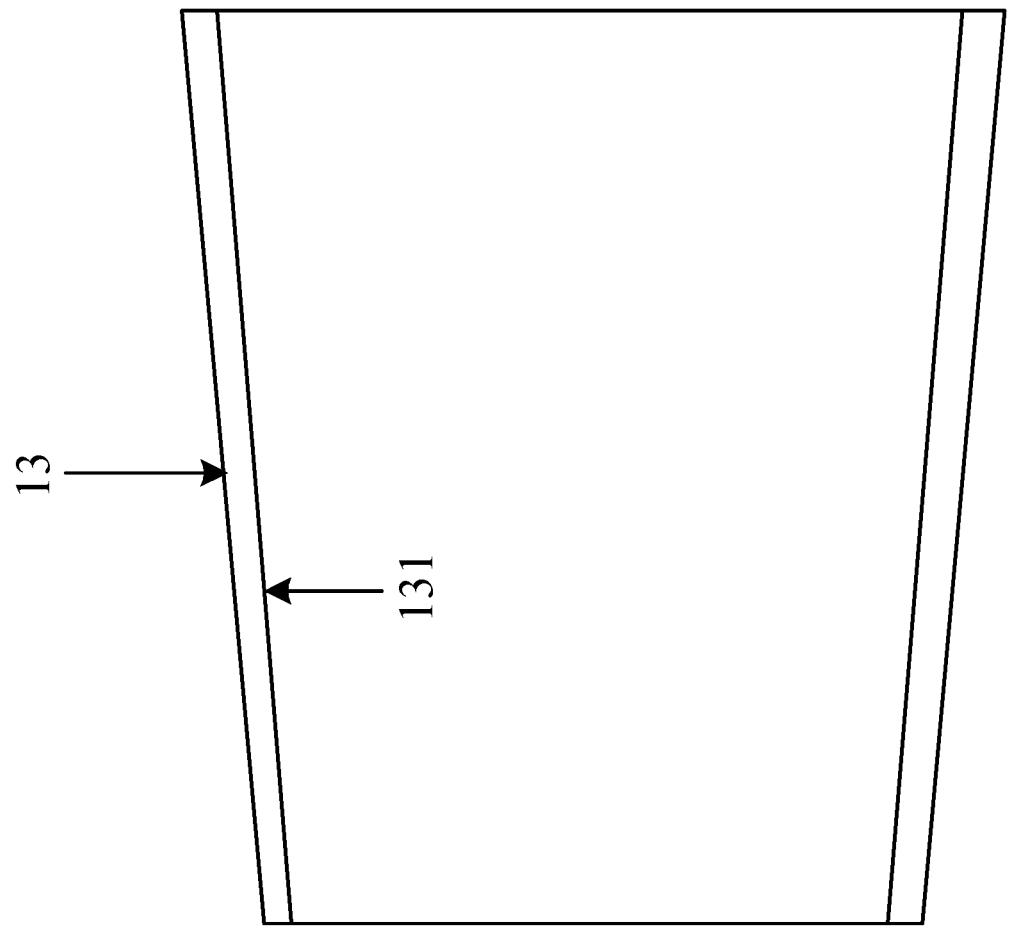
FIG. 2 is a schematic diagram showing a structure of another virtual reality lens barrel assembly according to an embodiment of the application.
Figure 2:
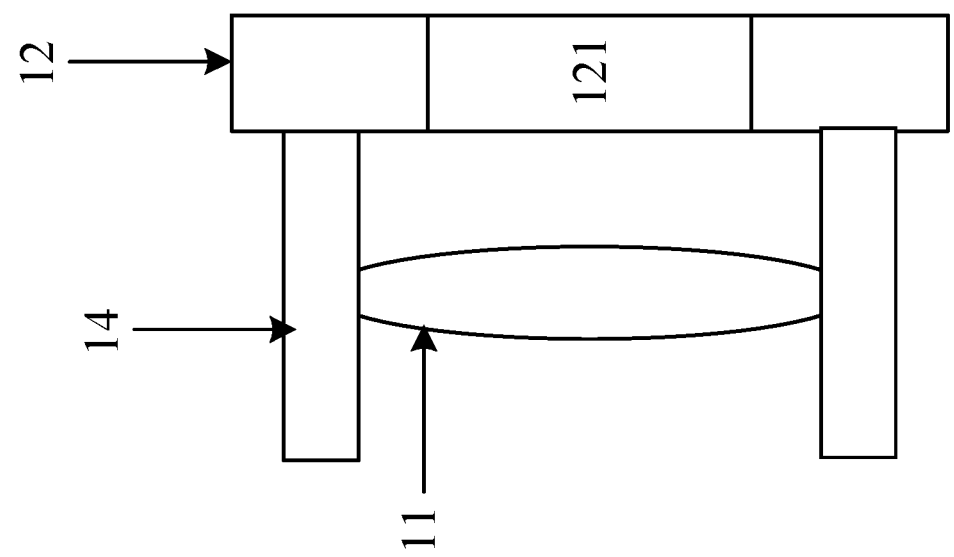

FIG. 2 shows a schematic diagram showing a structure of another virtual reality lens barrel assembly according to an embodiment of the present disclosure. Some adjustments are made on the virtual reality lens barrel assembly based on the virtual reality lens barrel assembly shown in FIG. 1.

The blocking mechanism 12 is located at one side, which is close to the lens barrel 13, of the lens 11. With such a structure, the blocking mechanism 12 may not be directly seen by the human eye, so that the viewing experience of the VR lens barrel assembly is improved. Both FIG. 2 and FIG. 1 show such a structure. However, the blocking mechanism 12 may be located at one side, which is away from the lens barrel 13, of the lens 11, which will not be limited in the embodiment of the present disclosure.

Alternatively, the virtual reality lens barrel assembly further includes a lens holder 14 on which the lens 11 is assembled. The lens holder 14 may be connected with the blocking mechanism 12.

Alternatively, the blocking mechanism 12 is an iris diaphragm. The iris diaphragm is a mechanical mechanism capable of forming a through hole with a variable size.

Figure 3:
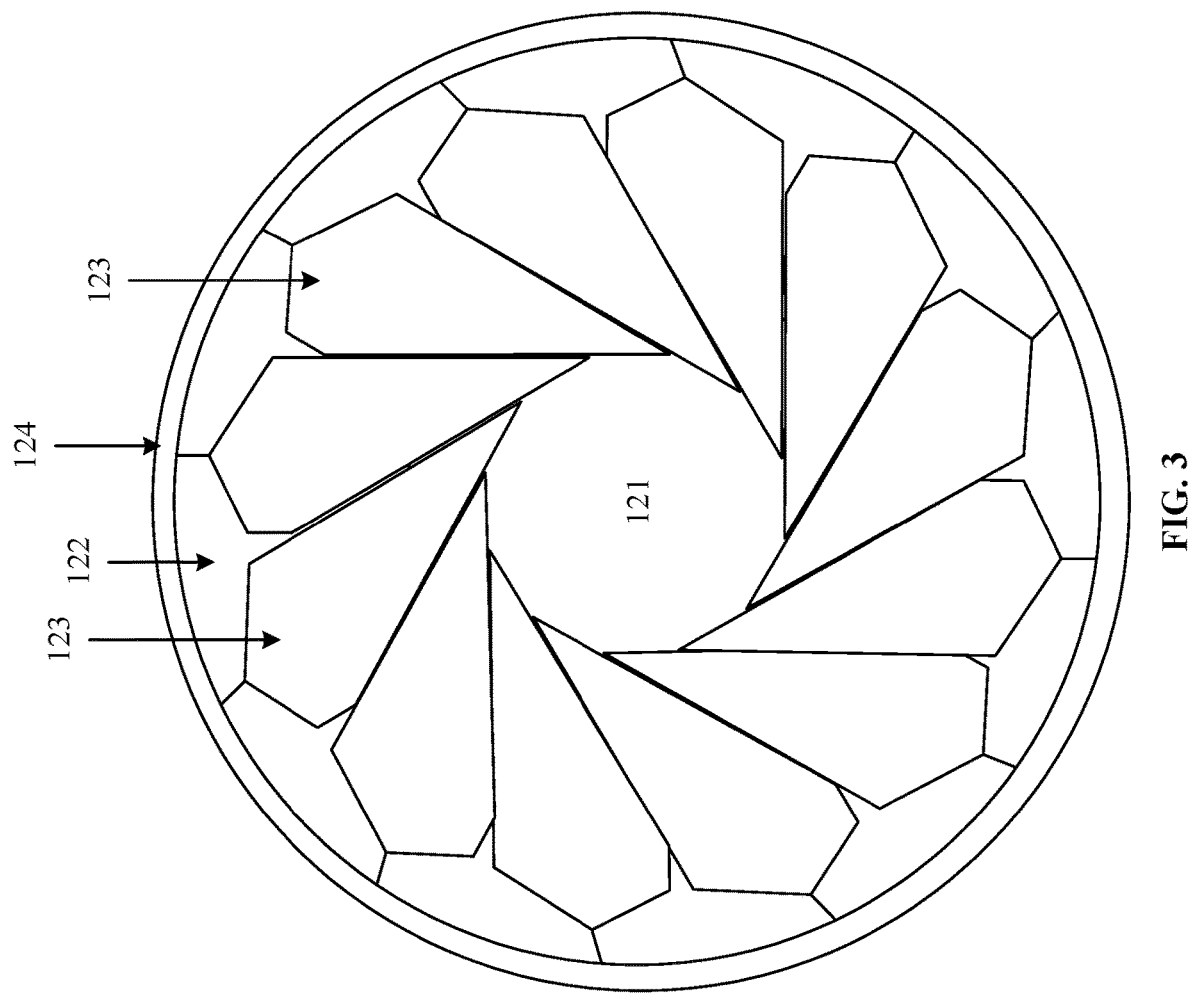
FIG. 3 is a right view schematically showing a structure of a blocking mechanism in a virtual reality lens barrel assembly shown in FIG. 2.

Alternatively, FIG. 3 is a right view schematically showing a structure of a blocking mechanism 12 in a virtual reality lens barrel assembly shown in FIG. 2.

The blocking mechanism 12 includes a ring support 122 and a plurality of hinges 123 positioned on the ring support 122. The plurality of hinges 123 enclose the through hole 121. The greater the number of hinges 123 is, the more the shape of the through hole 121 is close to circular. FIG. 3 shows one shape of a hinge 123. However, the hinge 123 may have other shapes, such as a water drop shape and a magatama shape, which are not be limited in the embodiment of the present disclosure. Alternatively, among the plurality of hinges 123, every two adjacent hinges 123 are movably connected.

Figure 4:
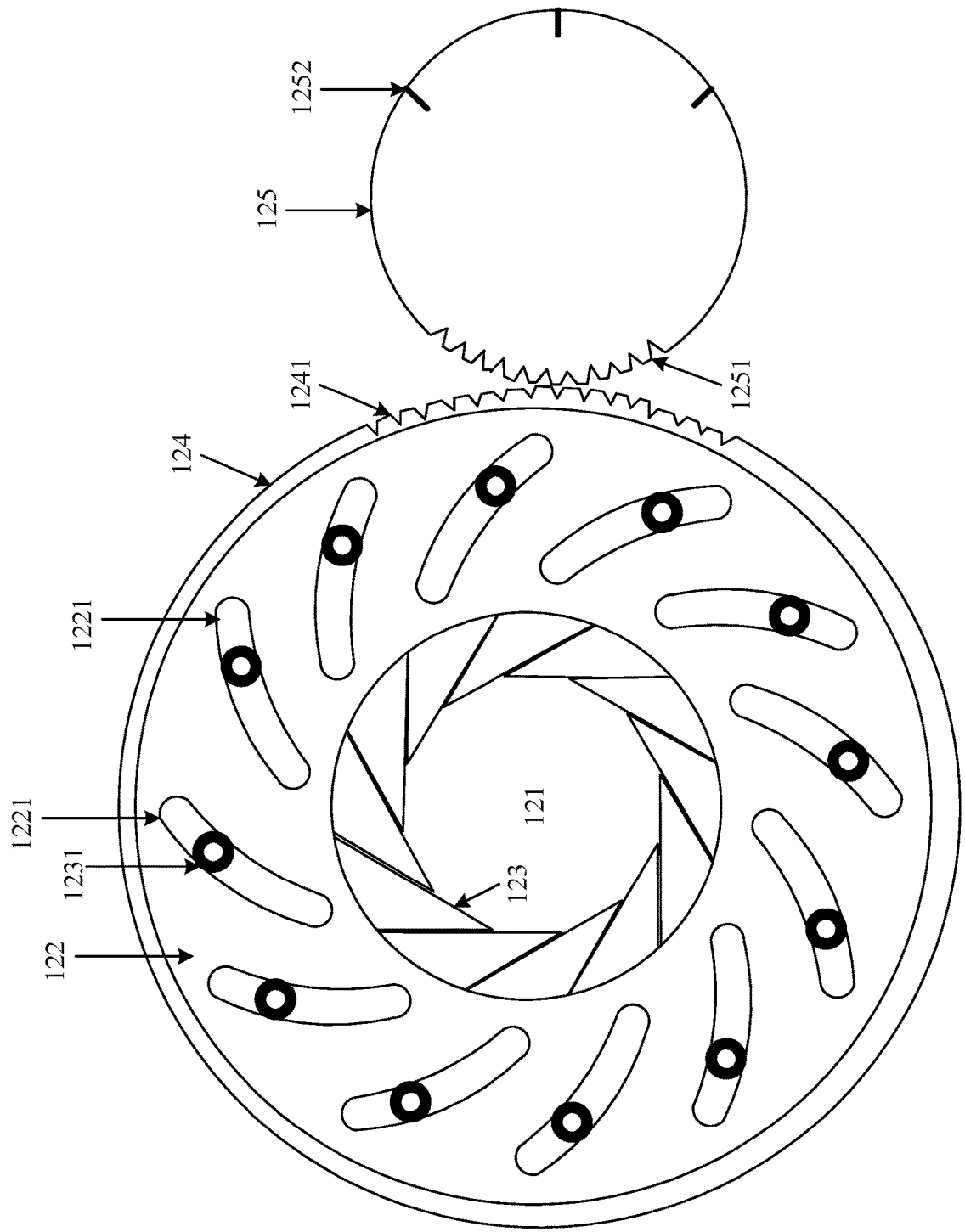
FIG. 4 is a left view schematically showing a structure of a blocking mechanism in a virtual reality lens barrel assembly shown in FIG. 2.

Alternatively, FIG. 4 is a left view schematically showing a structure of a blocking mechanism 12 in a virtual reality lens barrel assembly shown in FIG. 2.

The blocking mechanism 12 includes a sleeve 124, and the sleeve 124 is sleeved on the ring support 122 and rotatably connected with the ring support 122, that is, the ring support 122 can rotate within the sleeve 124.

Alternatively, a circular slide rail (not shown in FIG. 4) is provided on the inner wall of the sleeve 124, an axis of the circular slide rail is parallel to an axis of the sleeve, and the ring support 122 is assembled on the circular slide rail and can rotate within the circular slide rail.

A plurality of guide rails 1221 are provided on the ring support 122, a plurality of hinges 123 are assembled on the plurality of guide rails 1221 in a one-to-one manner, and the plurality of hinges 123 are respectively connected with the sleeve 124. The ring support 122 may be fixedly connected with the lens holder 14 shown in FIG. 2 to play a role of fixing the ring support 122, thereby facilitating the relative rotation between the ring support 122 and the sleeve 124.

Alternatively, each hinge 123 may be provided with an assembling end 1231 and the assembling end 1231 are assembled in the guide rails 1221.

Figure 5:
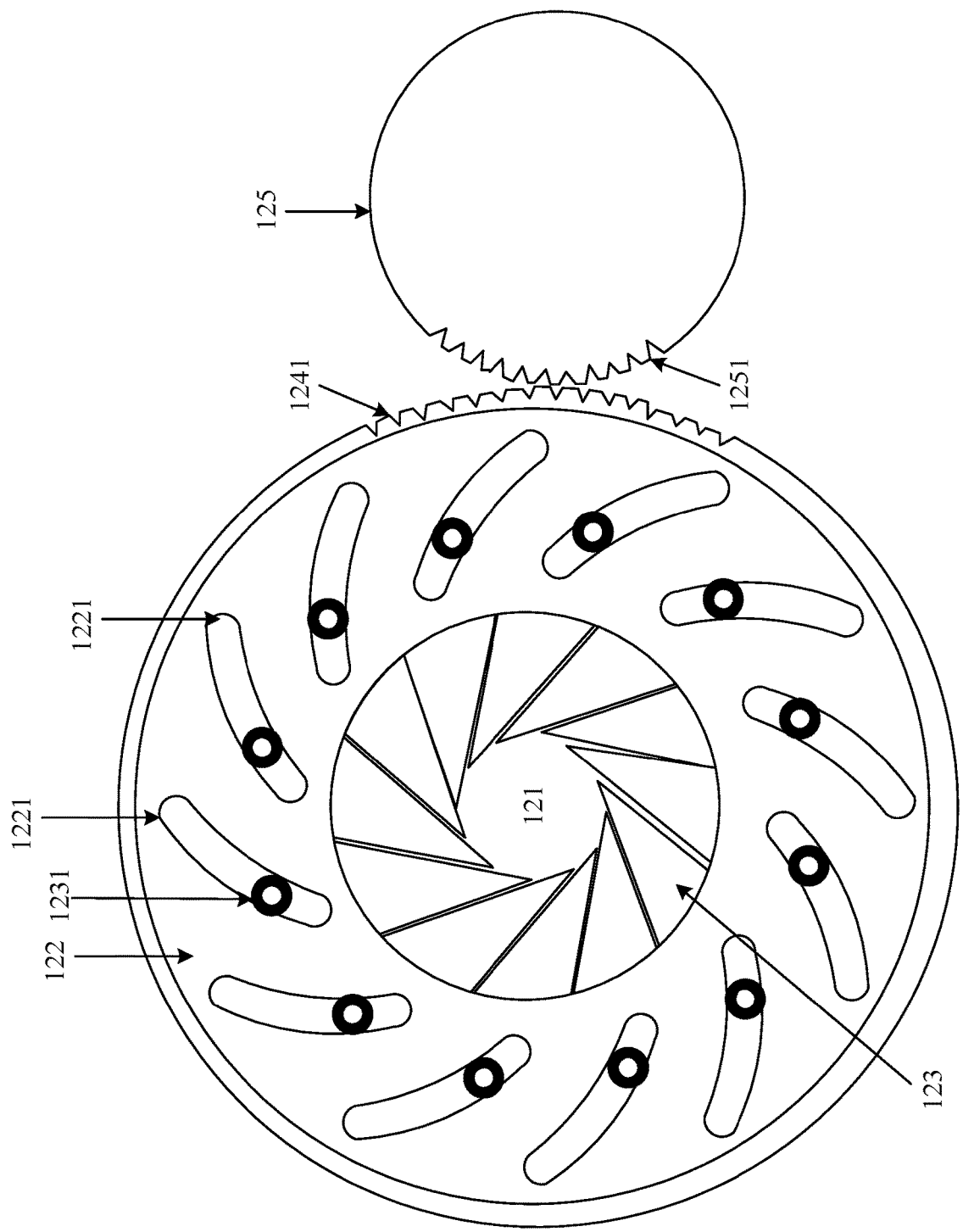
FIG. 5 is a schematic diagram showing a structure of a blocking mechanism after a sleeve in the blocking mechanism shown in FIG. 4 rotates in a clockwise direction.

When rotating, the sleeve 124 can drive the plurality of hinges 123 to move on the plurality of guide rails 1221 to adjust the size of the through hole 121. FIG. 5 is a schematic diagram showing a structure of a blocking mechanism after a sleeve 124 in the blocking mechanism shown in FIG. 4 rotates with respect to the ring support 122. It can be seen that the assembling ends 1231 on the hinges 123 slide toward the inside of the guide rails 1221 to drive the hinges 123 to move, and the through hole 121 enclosed by the plurality of hinges 123 is significantly reduced.

Alternatively, as shown in FIG. 4, a plurality of first gear teeth 1241 are provided on the outer wall of the sleeve 124. The plurality of first gear teeth 1241 are arranged along a circumferential direction of the sleeve 124.

The blocking mechanism 12 includes an adjusting knob 125. A plurality of second gear teeth 1251 are provided on the adjusting knob 125, and the plurality of second gear teeth 1251 are arranged along a circumferential direction of the adjusting knob 125 (the adjusting knob is generally cylindrical, and the circumferential direction of the adjusting knob is a direction around an axis of the adjusting knob).

The plurality of second gear teeth 1251 are meshed with the plurality of first gear teeth 1241. The adjusting knob 125 may reduce the difficulty of adjusting the size of the through hole 121 and increase the accuracy of adjusting the size of the through hole 121, which brings the convenience for the user to operate.

Alternatively, a plurality of level scales 1252 are provided on the adjusting knob 125, and the plurality of level scales 1252 respectively correspond to display assemblies with display areas of different sizes. That is, when the virtual reality lens barrel assembly provided in the embodiment of the present disclosure matches the display assemblies with display areas of different sizes, the adjusting knob 125 may be rotated to the scale corresponding to the display assembly. In this way, the virtual reality lens barrel assembly may be easily and quickly matched and applied to different display assemblies.

Alternatively, the virtual reality lens barrel assembly includes a motor (not shown in FIG. 4), the motor is connected with the adjusting knob 125 for driving the adjusting knob 125 to rotate. That is, the adjusting knob 125 may be driven by the motor so as to improve the rotation accuracy of the adjusting knob 125.

FIG. 4 shows a manner of adjusting the size of the through hole 121 by the adjusting knob 125. However, in the embodiment of the present disclosure, the size of the through hole 121 may be adjusted by other methods. Exemplarily, the blocking mechanism 12 may include an electromagnetic driving assembly (not shown in FIG. 4). The electromagnetic driving assembly may be used to drive the hinges 123 to move in the guide rails 1221 and then to adjust the size of the through hole 121.

As shown in FIG. 1, the lens barrel 13 is of a horn shape, the first opening k1 is smaller than the second opening k2, that is, the blocking mechanism 12 is positioned outside the smaller opening of the lens barrel 13, and the larger opening of the lens barrel 13 is provided with the display assembly. The size of the through hole 121 may be adjusted by rotating the adjusting knob 12.

Figure 6:
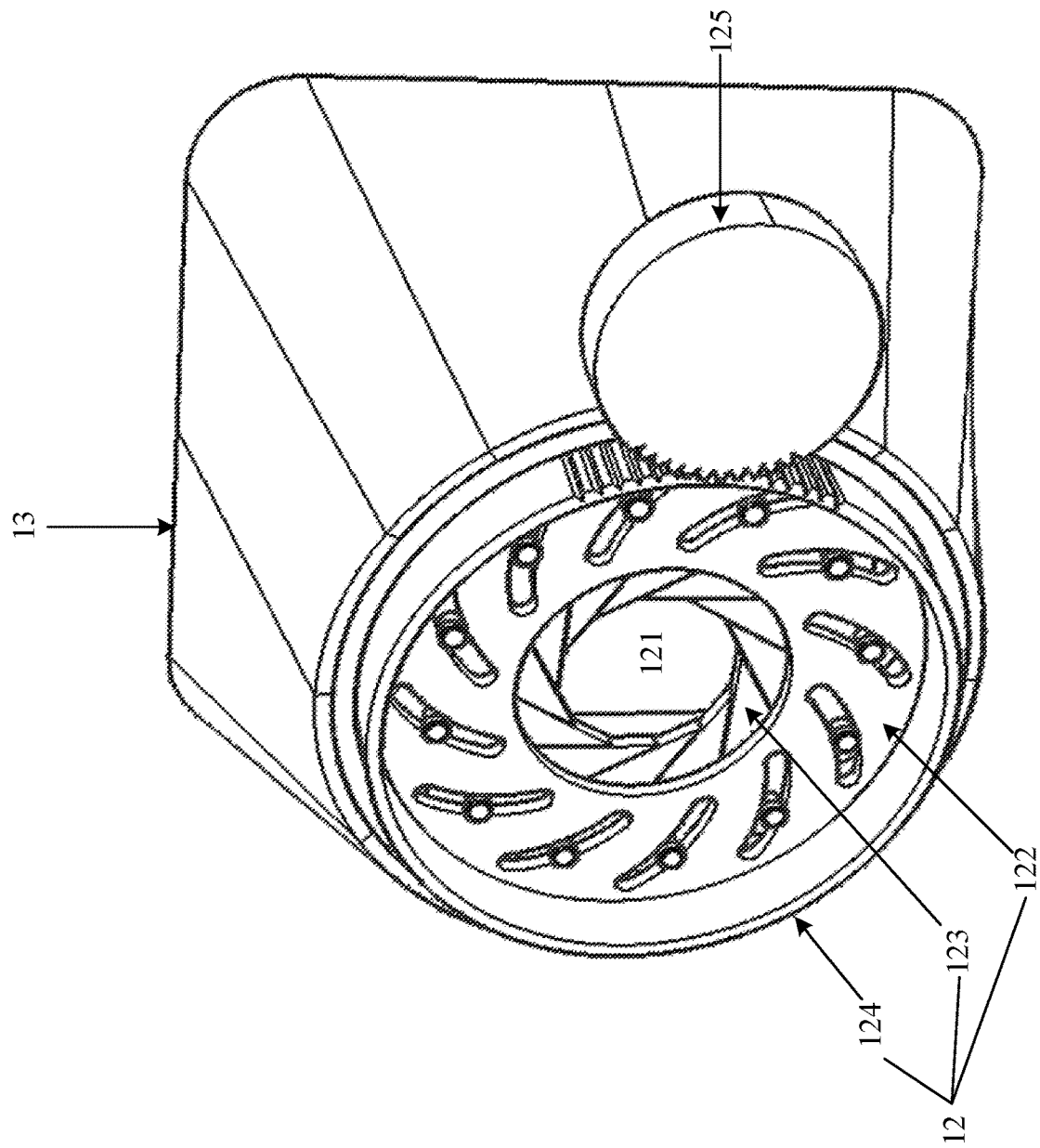
FIG. 6 is a schematic diagram showing a three-dimensional structure of a blocking mechanism and a lens barrel in a virtual reality lens barrel assembly according to an embodiment of the present disclosure.

FIG. 6 is a schematic diagram showing a three-dimensional structure of a blocking mechanism 12 and a lens barrel 13 in a virtual reality lens barrel assembly according to an embodiment of the present disclosure. The size of the through hole 121 may be adjusted by rotating the adjusting knob 125. Meanings of other symbols in FIG. 6 may be referred to FIG. 5, which are not repeatedly described herein.

Figure 7:
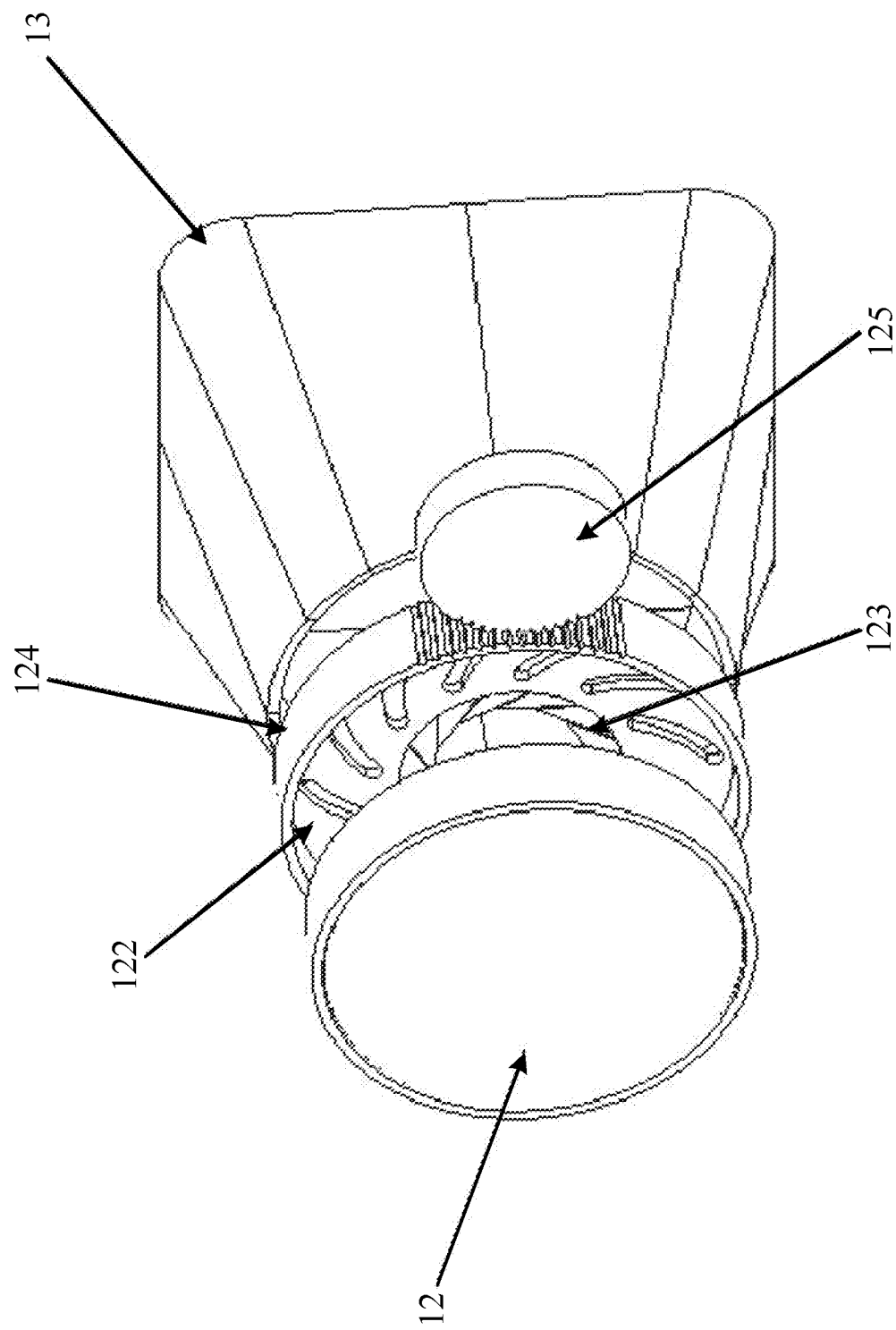
FIG. 7 is a schematic diagram showing a three-dimensional structure of the virtual reality lens barrel assembly shown in FIG. 2.

FIG. 7 is a schematic diagram showing a three-dimensional structure of a virtual reality lens barrel assembly shown in FIG. 2. The lens 11 is located at one side, which is away from a lens barrel 13, of a ring support 122. Meanings of other symbols in FIG. 7 may be referred to FIG. 2 and FIG. 6, which are not repeatedly described herein.

Alternatively, the virtual reality lens barrel assembly may further include a controller, the controller may obtain a size of a display area positioned in a display assembly (the size may be input by a user, or may be actively obtained by arranging a sensor in a lens barrel), and may control the motor according to the size to rotate the adjusting knob to the corresponding level scale, so as to realize the automatic adaptation of the display assembly and improve the user experience.

Alternatively, as shown in FIG. 2, when the through hole (121) has the maximum size, the through hole 121 is located in an area in which an orthographic projection of the lens 11 on the blocking mechanism 12 is located. That is, the size of the through hole 121 does not exceed that of the lens 11 at most, since when the size of the through hole 121 is larger than that of the lens 11, it is hard for the through hole 121 to play a role of adjusting the view.

Alternatively, the lens barrel 13 is made of polyvinyl chloride (PVC for short) or ethylene-tetra-fluoro-ethylene (ETFE for short). These materials can form the light-blocking lens barrel with an elasticity, and thus the durability of the lens barrel 13 is improved. After the virtual reality lens barrel assembly provided in the embodiment of the present disclosure matches the display assembly, the light-blocking lens barrel 13 may prevent external light from influencing the display effect.

Alternatively, a light absorbing material layer 131 is disposed on the inner wall of the lens barrel 13. The light absorbing material layer 131 may prevent the inner wall of the lens barrel 13 from reflecting light (the light may be the light emitted from the display assembly and if the light is reflected to the human eye, it will affect the display effect of the display assembly), so as to improve the display effect of the display assembly.

Figure 8:
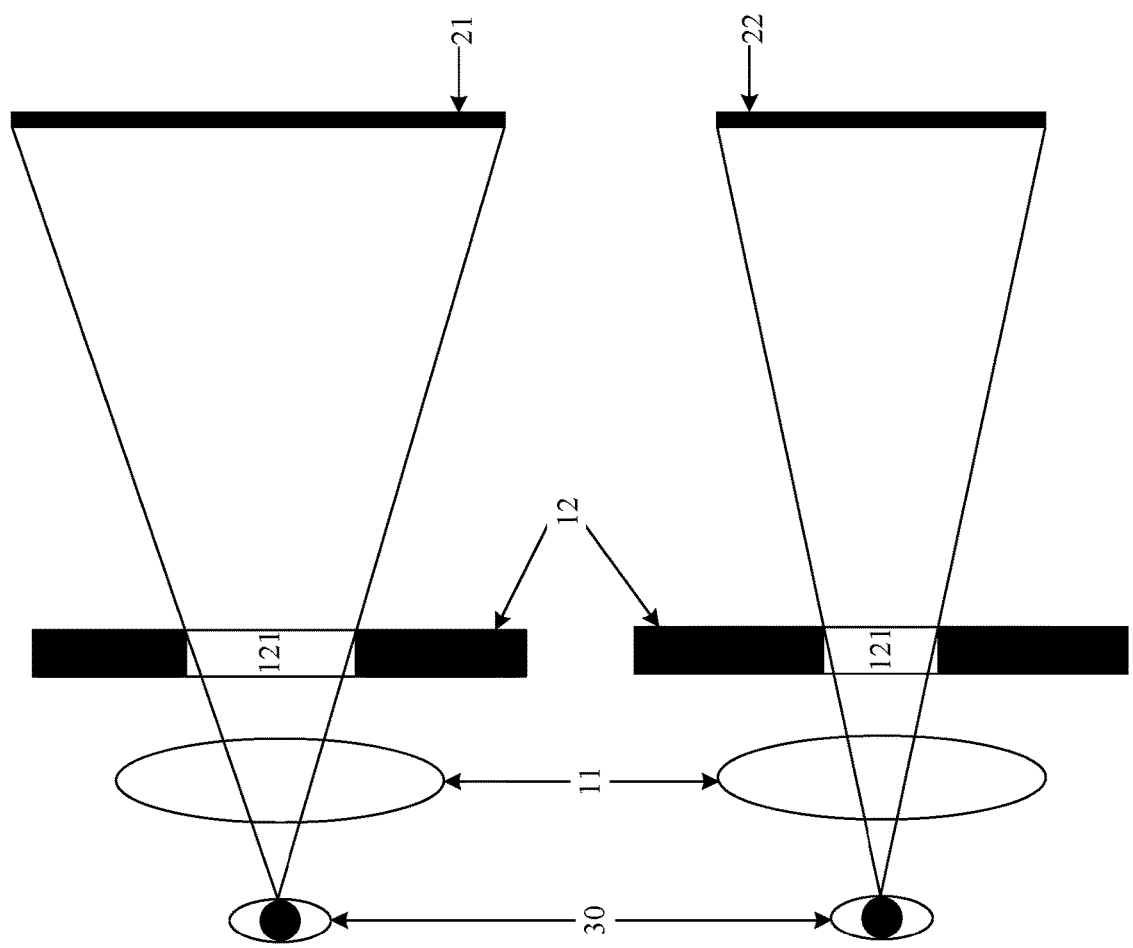
FIG. 8 is a schematic diagram showing a structure that the virtual reality lens barrel assemblies match two display assemblies having display areas of different sizes according to an embodiment of the present disclosure.

FIG. 8 is a schematic diagram showing a structure that a virtual reality lens barrel assembly is matched with two display assemblies with display areas of different sizes according to an embodiment of the present disclosure. The size of the display area of the display assembly 21 (one side, facing the human eye 30, of the display assembly 21 may serve as the display area) is larger than that of the display area of the display assembly 22, and the size of the through hole 121 in the blocking mechanism 12 may be adjusted, such that an area that may be seen by the human eye 30 is equal to the display area of the display assembly, the human eye is prevented from seeing the edge of the display area, and the immersion of the human eye is improved. The correspondence between the size of the through hole and the size of the display area may be obtained through a prior experiment.

The virtual reality lens barrel assembly provided in the embodiment of the present disclosure may be adapted to display assemblies of various sizes (the sizes of the display areas), thereby improving the versatility of the virtual reality lens barrel assembly and saving the costs.

In summary, in the virtual reality lens barrel assembly provided in the embodiment of the present disclosure, the blocking mechanism including the through hole with the variable size is provided in the lens barrel assembly, and the view range of the human eye is adjusted by the through hole with the variable size, so that the view range matches the size of the display area of the display assembly. In this way, the immersion of the virtual reality lens barrel assembly is improved. The problem that the immersion which may be provided by the VR lens barrel assembly in the related art is poor is solved. The effect of improving the immersion which may be provided by the VR lens barrel assembly is achieved.

Figure 9:
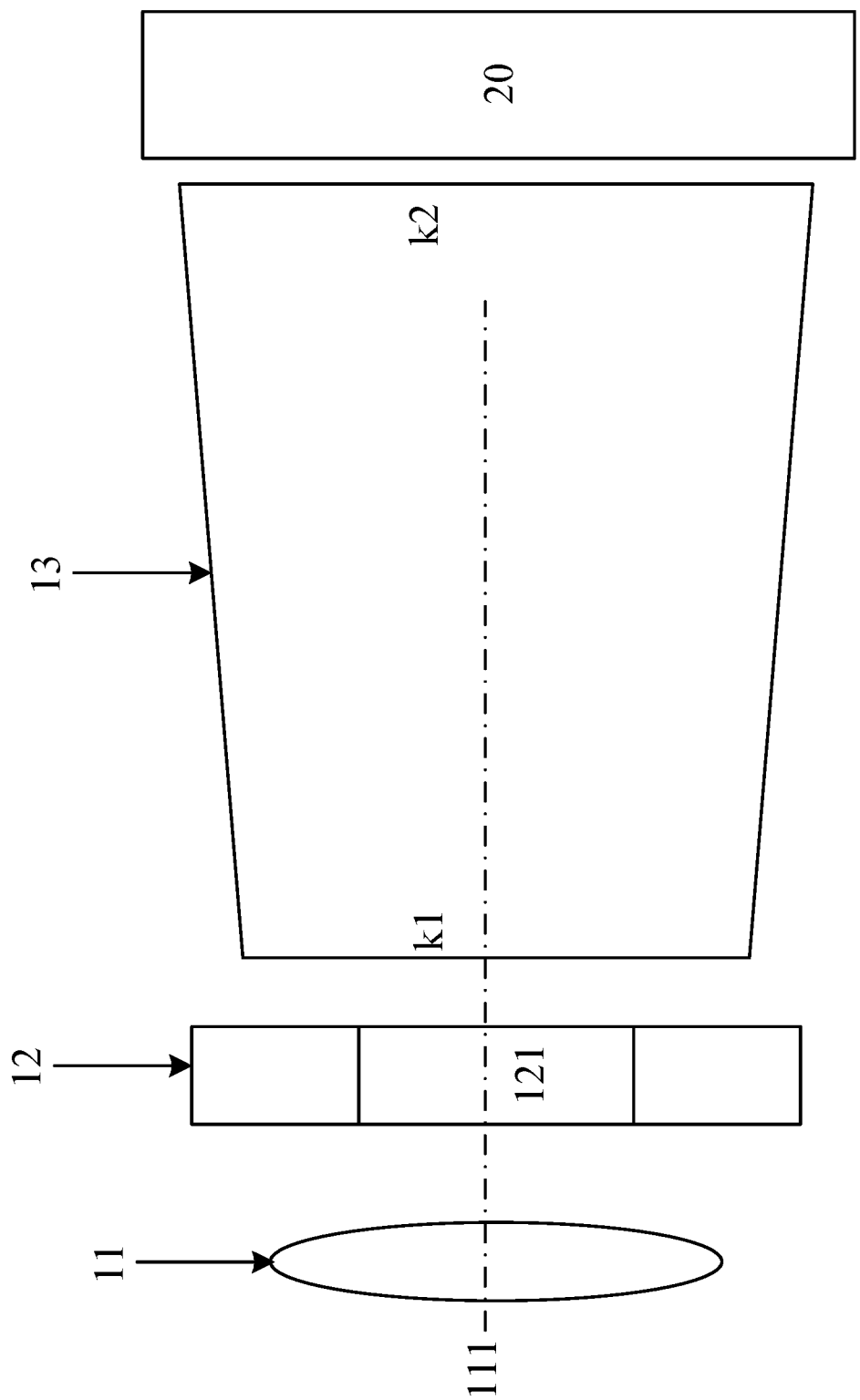
FIG. 9 is a schematic diagram showing a structure of a virtual reality device according to an embodiment of the present disclosure.

FIG. 9 is a schematic diagram showing a structure of a virtual reality device according to an embodiment of the present disclosure. The virtual reality device includes at least one virtual reality lens barrel assembly according to any one of the foregoing embodiments. The virtual reality device may be a pair of virtual reality glasses capable of being adapted to display assemblies of various sizes.

The virtual reality lens barrel assembly includes a lens 11, a blocking mechanism 12 and a lens barrel 13.

The lens barrel 13 is of a tubular structure with a first opening k1 and a second opening k2. The lens 11 and the blocking mechanism 12 are both located outside the first opening k1. The second opening k2 of the lens barrel 13 is provided with a display assembly. The blocking mechanism 12 includes a through hole 121 with a variable size. The optical axis 111 of the lens 11 passes through a center of the through hole 121 and the first opening k1.

Alternatively, the virtual reality device includes two virtual reality lens barrel assemblies and display assemblies corresponding to the two virtual reality lens barrel assemblies. Each of the two virtual reality lens barrel assemblies may correspond to one display assembly, or the two virtual reality lens barrel assemblies may correspond to the same display assembly.

An optical axis of the lens in each virtual reality lens barrel assembly may pass through a geometric center of the display area of the display assembly corresponding to the virtual reality lens barrel assembly to improve the display effect of the display assembly. The virtual reality device may be a pair of virtual reality glasses with display assemblies.

Figure 10:
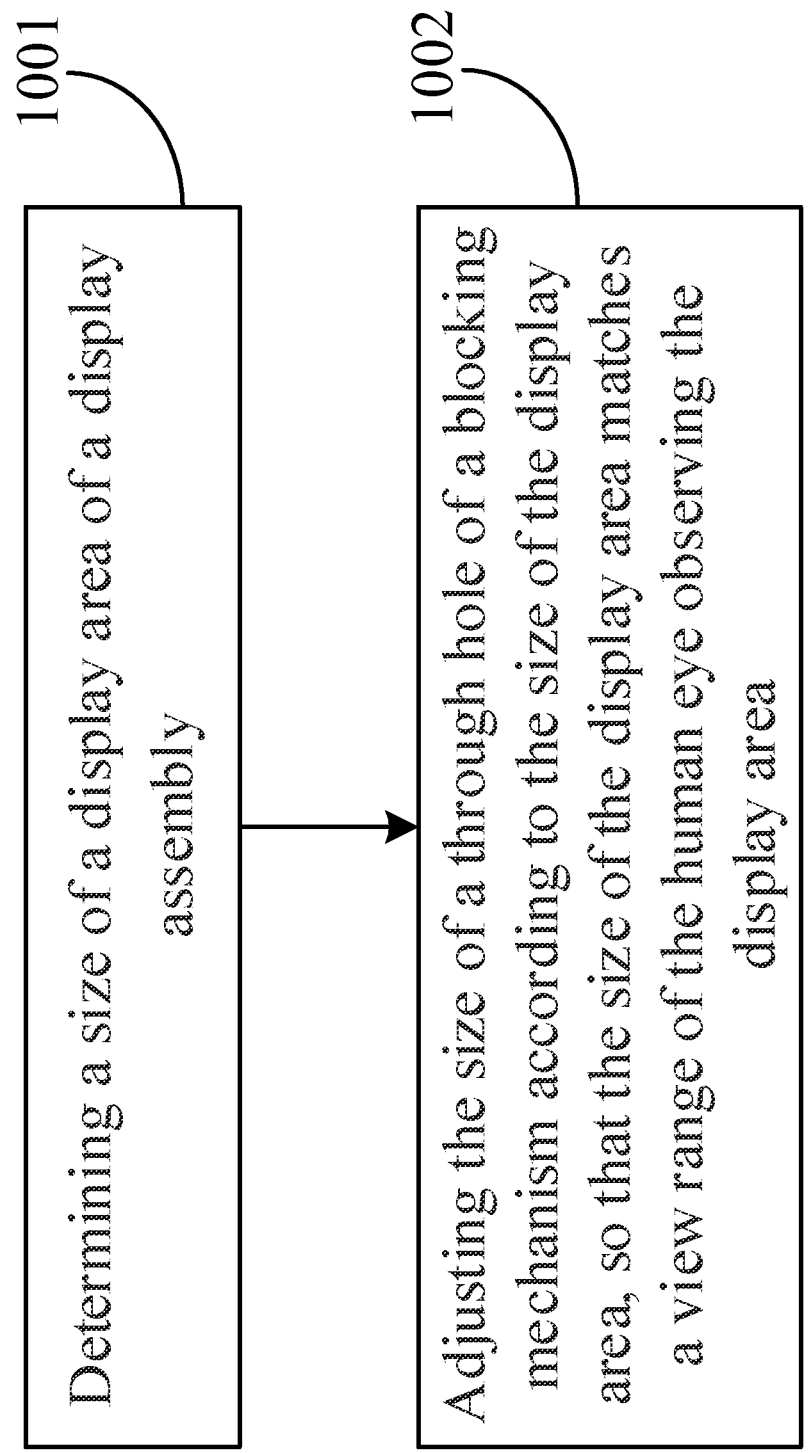
FIG. 10 is a flow diagram of a control method for a virtual display lens barrel assembly according to an embodiment of the present disclosure.

FIG. 10 is a flow diagram of a control method for a virtual display lens barrel assembly according to an embodiment of the present disclosure. The method may be applied to any one of the virtual display lens barrel assemblies provided in the foregoing embodiments. The method may include the following steps.

In step 1001, a size of a display area of a display assembly is determined.

The size of the display area of the display assembly may be input by a user, or may be obtained by arranging a sensor in a lens barrel.

In step 1002, the size of a through hole of a blocking mechanism is adjusted according to the size of the display area, so that the size of the display area matches a view range of the human eye observing the display area.

After the size of the display area is obtained, a controller in the virtual reality lens barrel assembly can be used to control a motor to rotate an adjusting knob to a corresponding level scale, so that the size of the display area matches the view range of the human eye observing the display area, and the automatic adaptation of the display assembly is achieved.

In summary, according to the control method for the virtual reality lens barrel assembly provided in the embodiment of the present disclosure, the size of the through hole is adjusted according to the size of the display area, and further the view range of the human eye is adjusted, so that the view range matches the size of the display area of the display assembly. In this way, the immersion of the virtual reality lens barrel assembly is improved. The problem that the immersion which may be provided by the VR lens barrel assembly in the related art is poor is solved. The effect of improving the immersion which may be provided by the VR lens barrel assembly is achieved.

In the present disclosure, the terms "first" and "second" are used for descriptive purposes only and should not be construed to indicate or imply the relative importance. The term "a plurality of" refers to two or more, unless explicitly defined otherwise.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A virtual reality lens barrel assembly, comprising a lens, a blocking mechanism and a lens barrel, wherein
the lens barrel is of a tubular structure with a first opening and a second opening, the lens and the blocking mechanism are both located outside the lens barrel and are located outside the first opening, and the second opening of the lens barrel is provided with a display assembly; and
the blocking mechanism comprises a through hole with a variable size, and an optical axis of the lens passes through a center of the through hole and the first opening;
wherein the first opening is smaller than the second opening; the virtual reality lens barrel assembly comprises a lens holder and the blocking mechanism comprises a ring support; the lens holder is fixedly connected with the ring support and extends from the ring support in a direction closes to the lens; and the lens is assembled on the lens holder;
wherein the blocking mechanism comprises a sleeve, the sleeve is sleeved on the ring support and rotatably connected with the ring support, a plurality of guide rails are provided on the ring support, and the plurality of hinges are assembled on the plurality of guide rails in a one-to-one manner, and the plurality of hinges are respectively connected with the sleeve; and
when rotating, the sleeve drives the plurality of hinges to move on the plurality of guide rails to adjust the size of the through hole; and
wherein a plurality of first gear teeth are provided on an outer wall of the sleeve, and the plurality of first gear teeth are arranged along a circumferential direction of the sleeve;
the blocking mechanism comprises an adjusting knob, a plurality of second gear teeth are provided on the adjusting knob, the plurality of second gear teeth are arranged along a circumferential direction of the adjusting knob, and an axis of the sleeve is parallel with an axis of the adjusting knob; and
the plurality of second gear teeth are meshed with the plurality of first gear teeth so as to rotate the sleeve and to adjust the size of the through hole.

2. The virtual reality lens barrel assembly according to claim 1, wherein the blocking mechanism is an iris diaphragm.

3. The virtual reality lens barrel assembly according to claim 2, wherein the blocking mechanism comprises a plurality of hinges assembled on the ring support, and the through hole is surrounded and formed by the plurality of hinges.

4. The virtual reality lens barrel assembly according to claim 1, wherein a circular slide rail is provided on an inner wall of the sleeve, an axis of the circular slide rail is parallel to an axis of the sleeve, and the ring support is assembled on the circular slide rail.

5. The virtual reality lens barrel assembly according to claim 1, wherein a plurality of level scales are provided on the adjusting knob, and the plurality of level scales correspond to display assemblies with display areas of different sizes.

6. The virtual reality lens barrel assembly according to claim 1, wherein the virtual reality lens barrel assembly comprises a motor and the motor is connected with the adjusting knob for driving the adjusting knob to rotate.

7. The virtual reality lens barrel assembly according to claim 1, wherein the blocking mechanism is located at one side, which is close to the lens barrel, of the lens.

8. The virtual reality lens barrel assembly according to claim 1, wherein when the through hole has a maximum size, the through hole is located in an area in which an orthographic projection of the lens on the blocking mechanism is located.

9. The virtual reality lens barrel assembly according to claim 1, wherein the lens barrel is made of polyvinyl chloride or ethylene-tetra-fluoro-ethylene.

10. The virtual reality lens barrel assembly according to claim 1, wherein a light absorbing material layer is provided on an inner wall of the lens barrel.

11. The virtual reality lens barrel assembly according to claim 1, wherein the blocking mechanism is located at one side, which is close to the lens barrel, of the lens;
- the blocking mechanism comprises a sleeve, a ring support and a plurality of hinges assembled on the ring support, the through hole is surrounded and formed by the plurality of hinges, the sleeve is sleeved on the ring support and rotatably connected with the ring support, a plurality of guide rails are provided on the ring support, the plurality of hinges are assembled on the plurality of guide rails in a one-to-one manner, the plurality of hinges are respectively connected with the sleeve, and when the sleeve rotates, the plurality of hinges are driven to move on the plurality of guide rails to adjust the size of the through hole;
- a circular slide rail is provided on an inner wall of the sleeve, an axis of the circular slide rail is parallel with an axis of the sleeve, and the ring support is assembled on the circular slide rail;
- a plurality of first gear teeth are provided on an outer wall of the sleeve, the plurality of first gear teeth are arranged along a circumferential direction of the sleeve, the blocking mechanism comprises an adjusting knob, a plurality of second gear teeth are provided on the adjusting knob, and the plurality of second gear teeth are arranged along a circumferential direction of the adjusting knob; and the plurality of second gear teeth are meshed with the plurality of first gear teeth; and
- a plurality of level scales are provided on the adjusting knob, and the plurality of level scales respectively correspond to plurality of display assemblies with display areas of different sizes.

12. A virtual reality device, comprising at least one virtual reality lens barrel assembly, wherein each of the at least one virtual reality lens barrel assembly comprises a lens, a blocking mechanism and a lens barrel;
- the lens barrel is of a tubular structure with a first opening and a second opening, the lens and the blocking mechanism are both located outside the lens barrel and are located outside the first opening, and the second opening of the lens barrel is provided with a display assembly; and
- the blocking mechanism comprises a through hole with a variable size, and an optical axis of the lens passes through a center of the through hole and the first opening; and
- wherein the first opening is smaller than the second opening; the virtual reality lens barrel assembly comprises a lens holder and the blocking mechanism comprises a ring support; the lens holder is fixedly connected with the ring support and extends from the ring support in a direction closes to the lens; and the lens is assembled on the lens holder;
- wherein the blocking mechanism comprises a sleeve, the sleeve is sleeved on the ring support and rotatably connected with the ring support, a plurality of guide rails are provided on the ring support, and the plurality of hinges are assembled on the plurality of guide rails in a one-to-one manner, and the plurality of hinges are respectively connected with the sleeve; and
- when rotating, the sleeve drives the plurality of hinges to move on the plurality of guide rails to adjust the size of the through hole; and
- wherein a plurality of first gear teeth are provided on an outer wall of the sleeve, and the plurality of first gear teeth are arranged along a circumferential direction of the sleeve;
- the blocking mechanism comprises an adjusting knob, a plurality of second gear teeth are provided on the adjusting knob, the plurality of second gear teeth are arranged along a circumferential direction of the adjusting knob, and an axis of the sleeve is parallel with an axis of the adjusting knob; and
- the plurality of second gear teeth are meshed with the plurality of first gear teeth so as to rotate the sleeve and to adjust the size of the through hole.

13. The virtual reality device according to claim 12, wherein the virtual reality device comprises two of the virtual reality lens barrel assemblies and display assemblies corresponding to the two of the virtual reality lens barrel assemblies.

14. The virtual reality device according to claim 12, wherein the blocking mechanism is located at one side, which is close to the lens barrel, of the lens;
- a circular slide rail is provided on an inner wall of the sleeve, an axis of the circular slide rail is parallel with an axis of the sleeve, and the ring support is assembled on the circular slide rail; and
- a plurality of level scales are provided on the adjusting knob, and the plurality of level scales respectively correspond to plurality of display assemblies with display areas of different sizes.

15. A control method for a virtual reality lens barrel assembly, wherein the control method is applied to a virtual reality lens barrel assembly, the virtual reality lens barrel assembly comprises a lens, a blocking mechanism and a lens barrel, the lens is of a tubular structure with a first opening and a second opening, the lens and the blocking mechanism are both located outside the lens barrel and are located outside the first opening, and the second opening of the lens barrel is provided with a display assembly; and the blocking mechanism comprises a through hole with a variable size, and an optical axis of the lens passes through a center of the through hole and the first opening, and wherein the first opening is smaller than the second opening; the virtual reality lens barrel assembly comprises a lens holder and the blocking mechanism comprises a ring support; the lens holder is fixedly connected with the ring support and extends from the ring support in a direction closes to the lens; and the lens is assembled on the lens holder;
- wherein the blocking mechanism comprises a sleeve, the sleeve is sleeved on the ring support and rotatably connected with the ring support, a plurality of guide rails are provided on the ring support, and the plurality of hinges are assembled on the plurality of guide rails in a one-to-one manner, and the plurality of hinges are respectively connected with the sleeve; and
- when rotating, the sleeve drives the plurality of hinges to move on the plurality of guide rails to adjust the size of the through hole; and
- wherein a plurality of first gear teeth are provided on an outer wall of the sleeve, and the plurality of first gear teeth are arranged along a circumferential direction of the sleeve;
- the blocking mechanism comprises an adjusting knob, a plurality of second gear teeth are provided on the adjusting knob, the plurality of second gear teeth are arranged along a circumferential direction of the adjusting knob, and an axis of the sleeve is parallel with an axis of the adjusting knob; and the plurality of second gear teeth are meshed with the plurality of first gear teeth so as to rotate the sleeve and to adjust the size of the through hole; and the control method comprises:

determining a size of a display area of the display assembly; and adjusting a size of the through hole of the blocking mechanism according to the size of the display area, such that the size of the display area matches a view range of a human eye of the display area.

* * * * *